United States Patent
Liu et al.

(10) Patent No.: US 9,787,500 B2
(45) Date of Patent: Oct. 10, 2017

(54) PREDICTIVE AND NOMADIC ROAMING OF WIRELESS CLIENTS ACROSS DIFFERENT NETWORK SUBNETS

(71) Applicant: Aerohive Networks, Inc., Milpitas, CA (US)

(72) Inventors: Changming Liu, Cupertino, CA (US); Yong Kang, Palo Alto, CA (US); Jianlin Zeng, San Jose, CA (US); Sreekanth Reddy, Edison, NJ (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 15/069,840

(22) Filed: Mar. 14, 2016

(65) Prior Publication Data

US 2016/0197742 A1    Jul. 7, 2016

Related U.S. Application Data

(63) Continuation of application No. 14/697,379, filed on Apr. 27, 2015, now Pat. No. 9,338,816, which is a
(Continued)

(51) Int. Cl.
*H04W 4/00* (2009.01)
*H04L 12/46* (2006.01)
(Continued)

(52) U.S. Cl.
CPC ............ *H04L 12/4633* (2013.01); *H04W 8/02* (2013.01); *H04W 8/087* (2013.01); *H04W 8/18* (2013.01);
(Continued)

(58) Field of Classification Search
CPC ............................ H04L 12/46; H04L 12/4633
(Continued)

(56) References Cited

U.S. PATENT DOCUMENTS

| 5,471,671 A | 11/1995 | Wang et al. |
| 5,697,059 A | 12/1997 | Carney |

(Continued)

FOREIGN PATENT DOCUMENTS

| EP | 0940999 | 9/1999 |
| EP | 1732276 | 12/2006 |

(Continued)

OTHER PUBLICATIONS

European Patent Application No. 11823931.8, Search Report dated Aug. 29, 2016.
(Continued)

*Primary Examiner* — Farah Faroul
(74) *Attorney, Agent, or Firm* — Sheppard, Mullin, Richter & Hampton LLP

(57) ABSTRACT

Wireless access points detect neighboring wireless access points in different subnets. Upon connecting with a wireless client, a wireless access point determines predictive roaming information for the wireless client. Predictive roaming information identifies the wireless client; its home network subnet; and includes connection information associated with the wireless client. The wireless access point forwards the predictive roaming information associated with a wireless client to neighboring wireless access points while the wireless client is still connected with the wireless access point. Neighboring wireless access points store received predictive roaming information. Upon connecting with a wireless client, a neighboring wireless access point determines if the wireless client matches the stored predictive roaming information. If so, the neighboring wireless access point uses the predictive roaming information to quickly connect with the wireless client and to establish a tunnel to redirect network traffic associated with the wireless client through to its home subnet.

18 Claims, 8 Drawing Sheets

Related U.S. Application Data continuation of application No. 13/937,676, filed on Jul. 9, 2013, now Pat. No. 9,019,938, which is a continuation of application No. 13/528,729, filed on Jun. 20, 2012, now Pat. No. 8,483,183, which is a continuation of application No. 12/120,338, filed on May 14, 2008, now Pat. No. 8,218,502.

(51) Int. Cl.

| | | |
|---|---|---|
| H04W 76/02 | (2009.01) | |
| H04W 76/04 | (2009.01) | |
| H04W 88/08 | (2009.01) | |
| H04W 36/00 | (2009.01) | |
| H04W 8/02 | (2009.01) | |
| H04W 36/08 | (2009.01) | |
| H04W 36/24 | (2009.01) | |
| H04W 8/08 | (2009.01) | |
| H04W 8/18 | (2009.01) | |
| H04W 8/00 | (2009.01) | |
| H04W 8/26 | (2009.01) | |
| H04W 28/08 | (2009.01) | |
| H04W 48/16 | (2009.01) | |
| H04W 12/04 | (2009.01) | |
| H04W 84/12 | (2009.01) | |
| H04L 29/06 | (2006.01) | |

(52) U.S. Cl.
CPC .... *H04W 36/0011* (2013.01); *H04W 36/0016* (2013.01); *H04W 36/0061* (2013.01); *H04W 36/0066* (2013.01); *H04W 36/08* (2013.01); *H04W 36/245* (2013.01); *H04W 76/022* (2013.01); *H04W 76/041* (2013.01); *H04W 88/08* (2013.01); H04L 63/0876 (2013.01); *H04W 8/005* (2013.01); *H04W 8/26* (2013.01); *H04W 12/04* (2013.01); *H04W 28/08* (2013.01); *H04W 48/16* (2013.01); *H04W 84/12* (2013.01)

(58) Field of Classification Search
USPC .................................................. 370/331, 332
See application file for complete search history.

(56) References Cited

U.S. PATENT DOCUMENTS

| | | |
|---|---|---|
| 5,726,984 A | 3/1998 | Kubler et al. |
| 5,956,643 A | 9/1999 | Benveniste |
| 6,061,799 A | 5/2000 | Eldridge et al. |
| 6,112,092 A | 8/2000 | Benveniste |
| 6,154,655 A | 11/2000 | Borst et al. |
| 6,201,792 B1 | 3/2001 | Lahat |
| 6,314,294 B1 | 11/2001 | Benveniste |
| 6,473,413 B1* | 10/2002 | Chiou ............... H04L 45/04 370/331 |
| 6,496,699 B2 | 12/2002 | Benveniste |
| 6,519,461 B1 | 2/2003 | Andersson et al. |
| 6,628,623 B1 | 9/2003 | Noy |
| 6,628,938 B1 | 9/2003 | Rachabathuni et al. |
| 6,636,498 B1 | 10/2003 | Leung |
| 6,775,549 B2 | 8/2004 | Benveniste |
| 6,865,393 B1 | 3/2005 | Baum et al. |
| 6,957,067 B1 | 10/2005 | Iyer et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,130,629 B1 | 10/2006 | Leung et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | O'Neill et al. |
| 7,181,530 B1 | 2/2007 | Halasz et al. |
| 7,216,365 B2 | 5/2007 | Bhagwat et al. |
| 7,224,697 B2 | 5/2007 | Banerjea et al. |
| 7,251,238 B2 | 7/2007 | Joshi et al. |
| 7,336,670 B1 | 2/2008 | Calhoun |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,370,362 B2 | 5/2008 | Olson et al. |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,562,384 B1 | 7/2009 | Huang |
| 7,593,356 B1 | 9/2009 | Friday et al. |
| 7,656,822 B1 | 2/2010 | AbdelAziz et al. |
| 7,706,789 B2 | 4/2010 | Qi et al. |
| 7,716,370 B1 | 5/2010 | Devarapalli |
| 7,751,393 B2 | 7/2010 | Chaskar et al. |
| 7,768,952 B2 | 8/2010 | Lee |
| 7,793,104 B2 | 9/2010 | Zheng et al. |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2 | 4/2011 | Chawla et al. |
| 7,949,342 B2 | 5/2011 | Cuffaro et al. |
| 7,961,725 B2 | 6/2011 | Nagarajan et al. |
| 7,970,894 B1 | 6/2011 | Patwardhan |
| 8,000,308 B2 | 8/2011 | Dietrich et al. |
| 8,069,483 B1 | 11/2011 | Matlock |
| 8,219,688 B2 | 7/2012 | Wang |
| 8,249,606 B1 | 8/2012 | Neophytou et al. |
| 8,493,918 B2 | 7/2013 | Karaoguz et al. |
| 8,789,191 B2 | 7/2014 | Bhagwat et al. |
| 8,824,448 B1 | 9/2014 | Narayana et al. |
| 8,948,046 B2 | 2/2015 | Kang et al. |
| 9,003,527 B2 | 4/2015 | Bhagwat et al. |
| 2001/0006508 A1 | 7/2001 | Pankaj et al. |
| 2002/0012320 A1 | 1/2002 | Ogier et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0128984 A1 | 9/2002 | Mehta et al. |
| 2003/0005100 A1 | 1/2003 | Barnard et al. |
| 2003/0039212 A1 | 2/2003 | Lloyd et al. |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2004/0003285 A1 | 1/2004 | Whelan et al. |
| 2004/0013118 A1 | 1/2004 | Borella |
| 2004/0022222 A1 | 2/2004 | Clisham |
| 2004/0054774 A1 | 3/2004 | Barber et al. |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0185876 A1 | 9/2004 | Groenendaal et al. |
| 2004/0192312 A1 | 9/2004 | Li et al. |
| 2004/0196977 A1 | 10/2004 | Johnson et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0259682 A1 | 11/2005 | Yosef et al. |
| 2005/0262266 A1 | 11/2005 | Wiberg et al. |
| 2005/0265288 A1 | 12/2005 | Liu et al. |
| 2005/0266848 A1 | 12/2005 | Kim |
| 2006/0010250 A1 | 1/2006 | Eisl et al. |
| 2006/0013179 A1 | 1/2006 | Yamane |
| 2006/0026289 A1 | 2/2006 | Lyndersay et al. |
| 2006/0062250 A1 | 3/2006 | Payne, III |

(56) References Cited

U.S. PATENT DOCUMENTS

| | | |
|---|---|---|
| 2006/0107050 A1 | 5/2006 | Shih |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1* | 10/2006 | Wang .............. H04W 8/08 455/432.1 |
| 2006/0245442 A1 | 11/2006 | Srikrishna et al. |
| 2006/0251256 A1 | 11/2006 | Asokan et al. |
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 | 1/2007 | Du |
| 2007/0025274 A1 | 2/2007 | Rahman et al. |
| 2007/0025298 A1 | 2/2007 | Jung |
| 2007/0049323 A1 | 3/2007 | Wang et al. |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0150720 A1 | 6/2007 | Oh et al. |
| 2007/0153741 A1* | 7/2007 | Blanchette .............. H04L 45/66 370/331 |
| 2007/0156804 A1 | 7/2007 | Mo |
| 2007/0160017 A1* | 7/2007 | Meier .................. H04W 36/18 370/338 |
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0247303 A1 | 10/2007 | Payton |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0095163 A1 | 4/2008 | Chen et al. |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0151751 A1 | 6/2008 | Ponnuswamy et al. |
| 2008/0159128 A1 | 7/2008 | Shaffer |
| 2008/0170527 A1 | 7/2008 | Lundsgaard et al. |
| 2008/0194271 A1 | 8/2008 | Bedekar et al. |
| 2008/0207215 A1 | 8/2008 | Chu et al. |
| 2008/0212562 A1* | 9/2008 | Bedekar .............. H04W 8/26 370/349 |
| 2008/0219286 A1 | 9/2008 | Ji et al. |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1 | 1/2009 | Strater et al. |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1 | 7/2009 | Davis |
| 2009/0197597 A1* | 8/2009 | Kotecha ................ H04W 8/082 455/433 |
| 2009/0207806 A1 | 8/2009 | Makela et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0303883 A1 | 12/2009 | Kucharczyk et al. |
| 2009/0310557 A1 | 12/2009 | Shinozaki |
| 2010/0046368 A1 | 2/2010 | Kaempfer et al. |
| 2010/0057930 A1 | 3/2010 | DeHaan |
| 2010/0067379 A1 | 3/2010 | Zhao et al. |
| 2010/0112540 A1 | 5/2010 | Gross et al. |
| 2010/0115278 A1 | 5/2010 | Shen et al. |
| 2010/0115576 A1 | 5/2010 | Hale et al. |
| 2010/0132040 A1 | 5/2010 | Bhagwat et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1 | 3/2011 | Michaelis et al. |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0085464 A1 | 4/2011 | Nordmark et al. |
| 2011/0182225 A1 | 7/2011 | Song et al. |
| 2011/0185231 A1 | 7/2011 | Balestrieri et al. |
| 2011/0258641 A1 | 10/2011 | Armstrong et al. |
| 2011/0292897 A1 | 12/2011 | Wu et al. |
| 2012/0014386 A1 | 1/2012 | Xiong et al. |
| 2012/0290650 A1 | 11/2012 | Montuno et al. |
| 2013/0003729 A1 | 1/2013 | Raman et al. |
| 2013/0003739 A1 | 1/2013 | Raman et al. |
| 2013/0003747 A1 | 1/2013 | Raman et al. |
| 2013/0028158 A1 | 1/2013 | Lee et al. |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0227306 A1 | 8/2013 | Santos et al. |
| 2013/0230020 A1 | 9/2013 | Backes |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1771026 | 4/2007 |
| EP | 1490773 | 1/2013 |
| WO | 0059251 | 10/2000 |
| WO | 2004042971 | 5/2004 |
| WO | 2006129287 | 12/2006 |
| WO | 2009141016 | 11/2009 |

OTHER PUBLICATIONS

Chirumamilla, Mohan K. et al., "Agent Based Intrustion Detection and Response System for Wireless LANs," CSE Conference and Workshop Papers, Paper 64, Jan. 1, 2003.

Clausen, T., et al., "Optimized Link State Routing Protocol (OLSR)," Network Working Group, pp. 1-71, Oct. 2003.

(56) References Cited

OTHER PUBLICATIONS

Craiger, J. Philip, "802.11, 802.1x, and Wireless Security," SANS Institute InfoSec Reading Room, Jun. 23, 2002.
Finlayson, Ross et al., "A Reverse Address Resolution Protocol," Nework Working Group, Request for Comments: 903 (RFC 903), Jun. 1984.
He, Changhua et al., "Analysis of the 802.11i 4-Way Handshake," Proceedings of the 3rd ACM Workshop on Wireless Security, pp. 43-50, Oct. 2004.
Lee, Jae Woo et al, "z2z: Discovering Zeroconf Services Beyond Local Link," 2007 IEEE Globecom Workshops, pp. 1-7, Nov. 26, 2007.
Perkins, C., et al., "Ad hoc On-Demand Distance Vector (AODV) Routing," Network Working Group, pp. 1-35, Oct. 2003.
Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.
European Patent Application No. 12879114.2, Search Report dated Jan. 21, 2016.
International Application No. PCT/US2008/061674, International Search Report and Written Opinion dated Oct. 14, 2008.
International Application No. PCT/US2011/047591, International Search Report and Written Opinion dated Dec. 19, 2011.
International Application No. PCT/US2012/059093, International Search Report and Written Opinion dated Jan. 4, 2013.

* cited by examiner

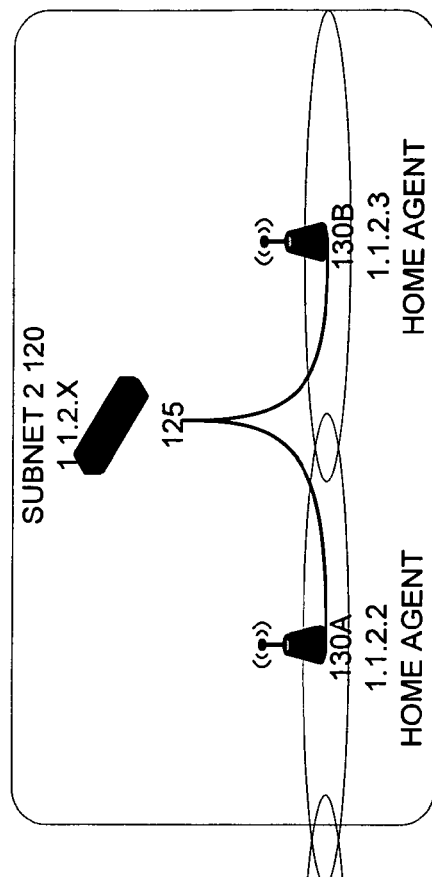
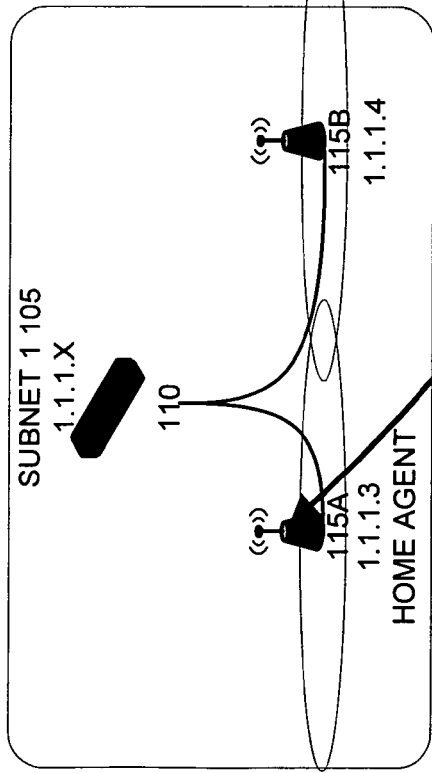
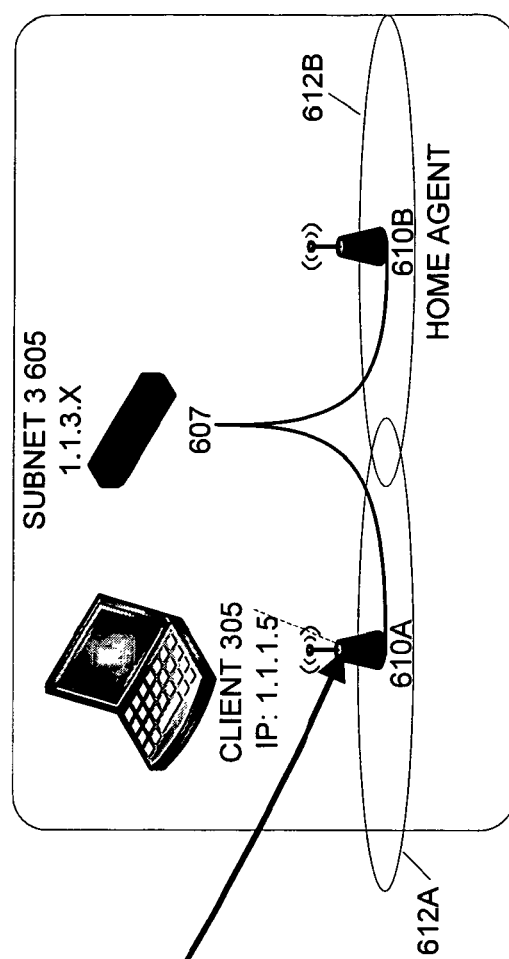
FIG. 6

PREDICTIVE AND NOMADIC ROAMING OF WIRELESS CLIENTS ACROSS DIFFERENT NETWORK SUBNETS

CROSS-REFERENCE TO RELATED APPLICATIONS

This application is a continuation of U.S. patent application Ser. No. 14/697,379, filed Apr. 27, 2015, entitled "Predictive and Nomadic Roaming of Wireless Clients Across Different Network Subnets," which is a continuation of U.S. patent application Ser. No. 13/937,676, filed Jul. 9, 2013, now U.S. Pat. No. 9,019,938, entitled "Predictive and Nomadic Roaming of Wireless Clients Across Different Network Subnets," which is a continuation of U.S. patent application Ser. No. 13/528,729, filed Jun. 20, 2012, now U.S. Pat. No. 8,483,183, entitled "Predictive and Nomadic Roaming of Wireless Clients Across Different Network Subnets," which is a continuation application of U.S. patent application Ser. No. 12/120,338, filed May 14, 2008, now U.S. Pat. No. 8,218,502, entitled "Predictive and Nomadic Roaming of Wireless Clients Across Different Network Subnets," all of which are incorporated by reference.

BACKGROUND

The present invention relates to the field of wireless data networks and systems and method for maintaining network service with mobile network clients. Wireless data networks allow computers or other electronic devices to exchange data without wires, typically using radio waves. Wireless networks are popular with users due to the ability to send and receive data almost anywhere within the physical coverage area of the network. This allows users to access communication networks, including local area networks, organization or company intranets, virtual private networks, and wide area networks, such as the Internet, anywhere within the physical coverage area of the wireless networks.

Wireless networks with large physical coverage areas, such as networks covering university campuses or entire cities, offer users ubiquitous access to their data and the Internet. However, typical wireless access points have ranges of around 100 feet. As a result, large wireless networks require tens, hundreds, or thousands of wireless access points to provide network coverage over a large physical area.

Configuring, managing, and operating a large number of wireless access points requires complicated network configurations. Typically, a large wireless network is divided into a number of different network subnets. Each network subnet includes one or more wireless access points. Each network subnet is assigned a specific range of IP addresses. All of the wireless access points within a subnet as well as the wireless client devices connected with these wireless access points are assigned IP addresses within the range of IP addresses associated with a subnet.

The use of multiple subnets within a wireless network introduces the problem of roaming. A wireless client, especially mobile devices, may move to different physical locations while connected with the wireless network. If a wireless client moves from the physical area associated with one wireless access point to a physical area associated with a second wireless access point, it is desirable for the wireless client to automatically connect with the second wireless access point to maintain its network connection. If both wireless access points are within the same subnet, the wireless client can keep the same IP address, allowing roaming to occur seamlessly without any noticeable disruption in the network connection or data traffic.

However, if a wireless client moves between wireless access points in different subnets, the wireless client cannot keep the same IP address. This is because each subnet has its own exclusive range of IP addresses. When the wireless client is connected with a wireless access point in a first subnet, the wireless client will have an IP address in the first subnet's IP address range. When the wireless client tries to connect with a wireless access point in a second subnet, its IP address is outside the second subnet's IP address range. As a result, the wireless client must be reauthenticated and assigned a new IP address that is valid for the second subnet. This process can cause noticeable disruption in the network connection and data traffic for the wireless client. This disruption is unacceptable for some applications, such as VOIP telephone applications.

The Mobile IP protocol is one approach for maintaining network connections of wireless devices. In the Mobile IP protocol, a wireless client is identified by its home address disregarding its current location in the Internet. The wireless client also carries the address of a home agent, which is a device located within the same subnet as its home address. When a wireless client moves from its home address to a new subnet, the wireless client locates a designated forwarding agent within the new subnet. The wireless client provides the forwarding agent with the address of its home agent. The forwarding agent then sets up a network tunnel with the home agent. Network traffic directed to the wireless client's home address is intercepted by the home agent and sent via the tunnel to the forwarding agent, which in turn forwards it to the wireless client. Similarly, network traffic from the wireless client is intercepted by the forwarding agent and sent via the tunnel to the home agent, which in turn forwards it to its intended destination.

One problem with the Mobile IP protocol is that it relies on the wireless client to maintain the network connection when roaming. The wireless client is responsible for carrying the address of the home agent and for contacting a forwarding agent as needed. To meet these responsibilities, the wireless client must either include a modified network driver stack or applications that support Mobile IP. The wireless client must keep track of two different IP addresses: the initial IP address in the client's "home" subnet and the IP address in the client's current subnet. Even if wireless clients include these capabilities, it is difficult and time-consuming to correctly configure large numbers of wireless clients to support Mobile IP roaming within a wireless network. Furthermore, wireless clients may need to be reconfigured whenever there are changes in network topology.

Therefore, there is an unmet need to enable wireless clients to roam without modifying the wireless client or its applications to support roaming protocols. There is also an unmet need for wireless clients to roam without requiring special configuration or knowledge of the network topology. There is also an unmet need to support wireless client roaming in an efficient and reliable manner.

SUMMARY

An embodiment of the invention provides predictive and nomadic roaming to support wireless clients roaming between network subnets. In an embodiment, each wireless access point selects at least one home agent in its subnet to support network traffic from roaming wireless clients. Wireless access points also detect neighboring wireless access points in different subnets. Wireless access points provide the address of their home agents to neighboring wireless access points, which in turn forward these addresses to their own home agents. Thus, each home agent knows the addresses of home agents in other network subnets.

Upon connecting with a wireless client, an embodiment of a wireless access point or other device determines predictive roaming information for the wireless client. Predictive roaming information may include information identifying the wireless client; its home network subnet (e.g. the network subnet associated with the wireless client's current IP address); and connection information used to communicate with the wireless client, such as session keys and virtual LAN information. An embodiment of the wireless access point forwards the predictive roaming information associated with a wireless client to at least a portion of its neighboring wireless access points while the wireless client is still connected with the wireless access point.

Neighboring wireless access points cache or store received predictive roaming information. Upon connecting with a wireless client, a neighboring wireless access point compares identifying information of the newly connected wireless client with the cached predictive roaming information. If the newly connected wireless client matches at least a portion of the predictive roaming information, the neighboring wireless access point uses the predictive roaming information to quickly connect with the wireless client and to establish a tunnel to redirect network traffic associated with the wireless client through to its home subnet.

In an embodiment, a neighboring wireless access point contacts its home agent to determine the address of a home agent in the home subnet of a wireless client. The neighboring wireless access point then establishes a tunnel between itself or another device in its own subnet to the home agent or other device in the home subnet of the wireless client. The home agent in the home subnet of the wireless client may be selected using a load balancing technique. Additionally, the home agent in the home subnet of the wireless client may be configured to intercept network traffic associated with the wireless client. In an embodiment, the neighboring wireless access point uses layer 2 routing to communicate with the wireless client, allowing the wireless client to continue using its IP address in a different subnet.

In an embodiment, if the newly connected wireless client does not match at least a portion of the predictive roaming information of a neighboring wireless access point, the neighboring wireless access point sends a query message to its home agent to identify the home subnet of the wireless client. The home agent forwards the query message to home agents in other subnets, which in turn may forward the query message to wireless access points and other devices to identify the home subnet of the wireless client. The neighboring wireless access point will eventually receive a response to the query message that identifies the home subnet of the wireless client. The wireless access point will then use this home subnet information to establish a tunnel to redirect network traffic for the wireless client through its home subnet, as described above. Later, if the wireless client's network connection becomes idle, a further embodiment of the invention will assign a new IP address within the current subnet to the wireless client and potentially remove the tunnel to conserve network resources.

BRIEF DESCRIPTION OF THE DRAWINGS

Techniques associated with the invention are illustrated by way of example in the figures.

FIG. 6 illustrates an example of nomadic roaming according to an embodiment of the invention.

In the drawings, the use of identical reference numbers indicates identical elements.

DETAILED DESCRIPTION

Figure 1:
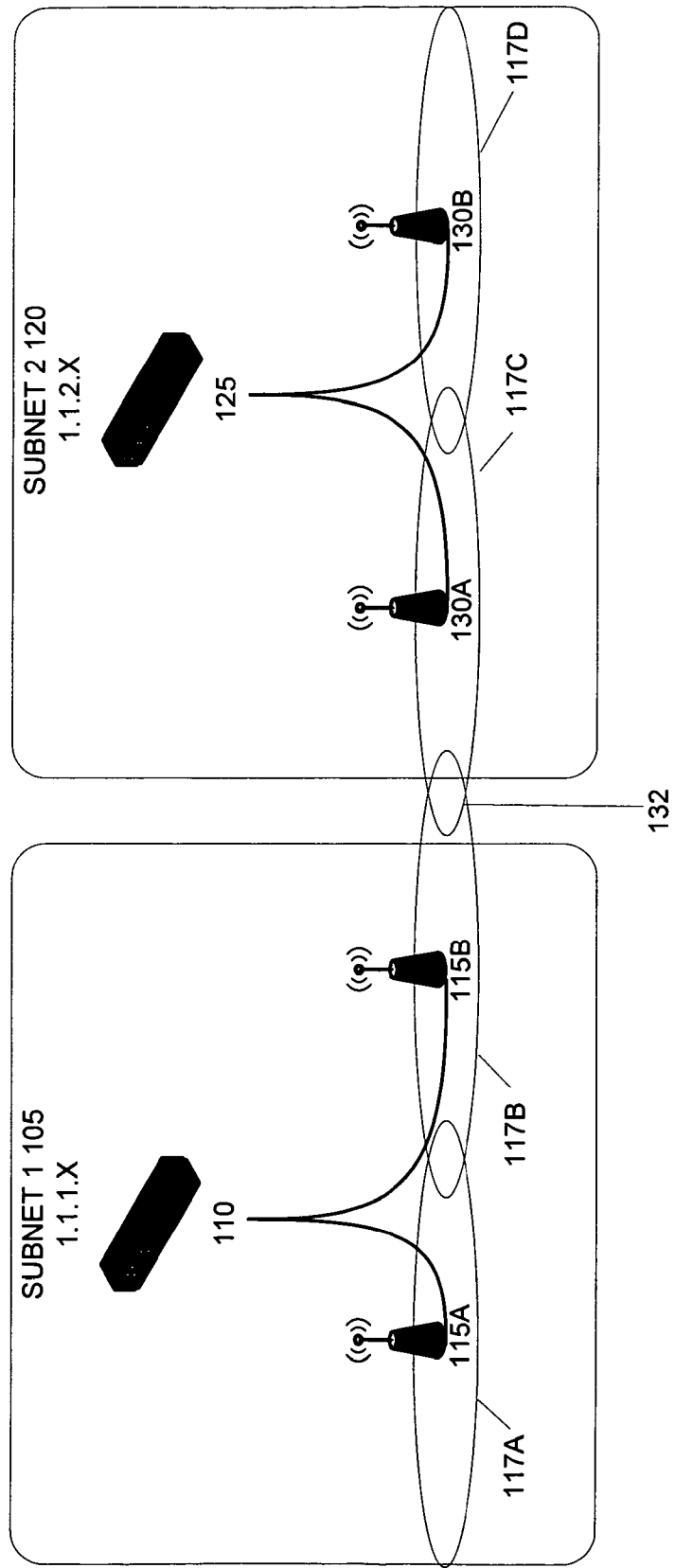
FIG. 1 illustrates an example wireless network according to an embodiment of the invention.

FIG. 1 illustrates an example wireless network 100 according to an embodiment of the invention. Wireless network 100 includes subnet 1 105, which is associated with the range of IP addresses 1.1.1.X, and subnet 2 120, which is associated with the range of IP addresses I.I.2.X. In an embodiment, devices in subnets 1 105 and 2 120 are connected with each other and other networks, such as the Internet, via wired or wireless network connections, which are omitted from the figures for clarity.

Subnet 1 105 includes a switch 110 responsible for connecting network segments. In an embodiment, switch 110 is a layer 2 network switch, such as a network bridge, adapted to direct network traffic at the data link layer of a networking protocol, for example using media access control (MAC) addresses, rather than IP address. In another embodiment, switch 1 110 may be a layer 3 network switch, such as a router, or include higher-level network traffic control, such as layer 4 firewalls and network address translation.

Subnet 1 105 includes wireless access points 115, including wireless access points 115*a* and 115*b*. Wireless access points 115 may implement any type of standard or proprietary wireless data communication protocols, including the 802.11 family of protocols, such as 802.11a, 802.11b, 802.11g, and 802.11n. Wireless access points 115 are connected with the switch 110 via wired or wireless network connections. Each of the wireless access points 115 may provided wireless data communications with one or more wireless network clients. Similar to subnet 1 105, subnet 2 120 includes switch 125, similar to switch 110, and wireless access points 130, similar to wireless access points 115.

Each of the wireless access points 115 and 130 has a physical coverage area 117, which is the physical area in which a wireless client device may be able to connect with a wireless access point. To ensure continuous network coverage, the physical coverage areas 117 of the wireless access points 115 and 130 may overlap. For example, the physical coverage area 117*a* of wireless access point 115*a* overlaps the physical coverage area 117*b* of wireless access point 115*b*. Additionally, physical coverage areas of wireless access points in different subnets may overlap if the wireless access points are physically close together. For example, physical coverage area 117b, associated with subnet 1 105, overlaps physical coverage area 117c, associated with subnet 2 120, in area 132.

Figure 2:
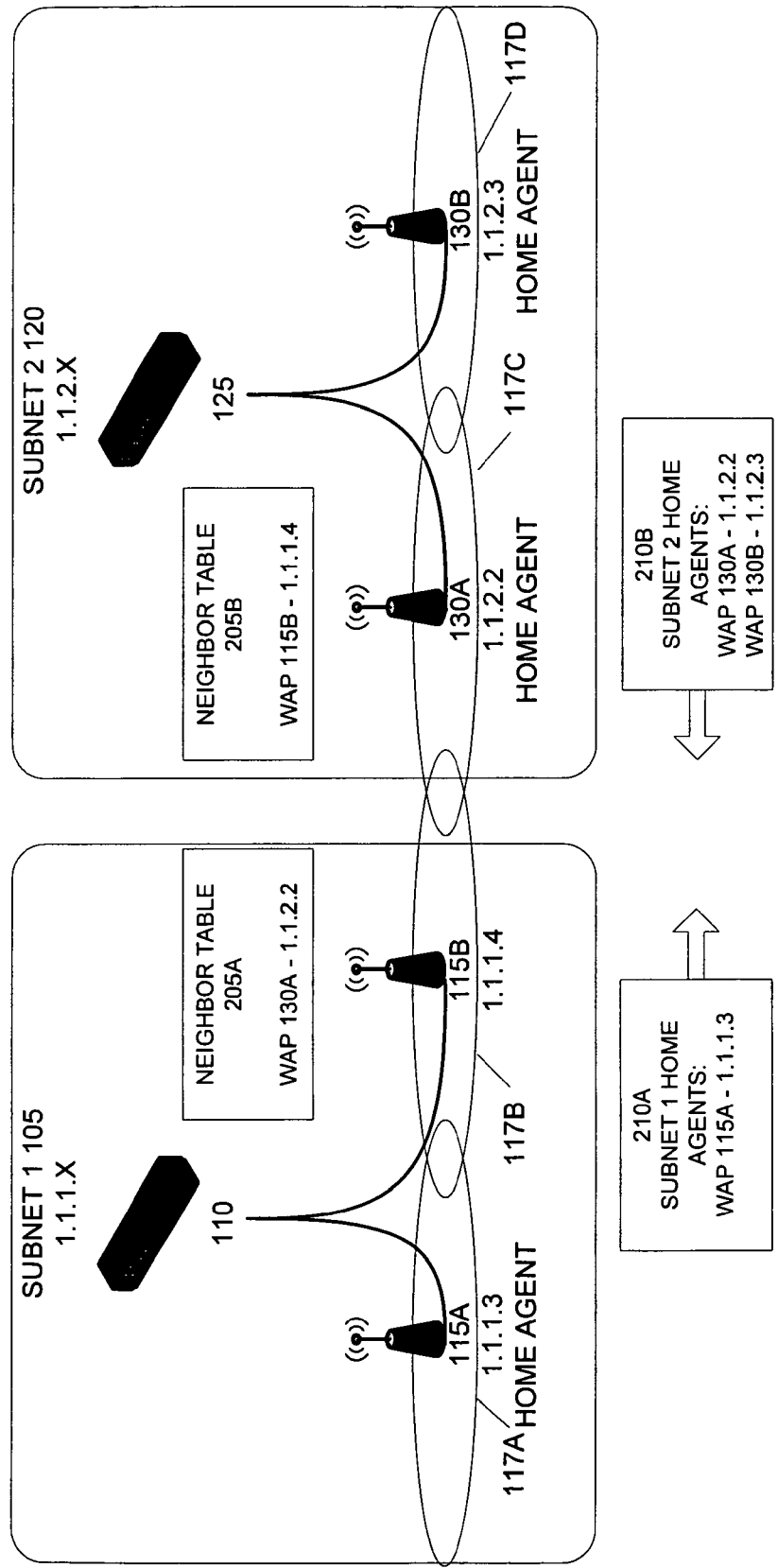
FIG. 2 illustrates an example network initialization for roaming according to an embodiment of the invention.

FIG. 2 illustrates an example network initialization 200 for roaming according to an embodiment of the invention. In an embodiment, a wireless network, such as wireless network 100, is initialized for roaming wireless clients by 1) discovering neighboring wireless access points; 2) selecting home agents; and 3) exchanging home agent addresses.

To discover neighboring wireless access points, an embodiment of the invention includes wireless access points adapted to scan available wireless data radio channels for wireless access points in different subnets. In an embodiment, wireless access points periodically broadcast a beacon signal identifying themselves to any nearby wireless access points. The beacon signal may include a wireless access point's IP address or other information identifying the wireless access point's network subnet.

Upon receiving a beacon signal from another wireless access point, an embodiment of a wireless access point compares the subnet specified by the beacon signal with its own subnet. If the wireless access point determines that the beacon signal is associated with a wireless access point in a different subnet, the wireless access point adds this wireless access point to its neighbor table with a designation indicating that it is in a different subnet. This indication may include the address, such as an IP address, of the wireless access point in the other subnet.

For example, because wireless access points 115b and 130a have overlapping physical coverage areas 117, they will detect each other's beacon signals. As a result, wireless access point 115b will add wireless access point 130a to its neighbor table 205a. In this example, neighbor table 205a will include the IP address, 1.1.2.2, of wireless access point 130a. Similarly, wireless access point 130a will add wireless access point's 115b IP address of 1.1.1.4 to its neighbor table 205b.

In a further embodiment, neighboring wireless access points may discover each other using probe request and probe response message. In this embodiment, a wireless access point periodically scans all communication channels and sends out probe request frames. Any neighboring wireless access points using one of these communication channels and receiving a probe request frame will respond with a probe response frame that includes identifying information, such as the neighboring wireless access points IP address or network subnet.

Additionally, the network initialization 200 selects one or more home agents within its network subnet for each wireless access point. A home agent may be a wireless access point, a network switch, a dedicated device, a computer system, or any other device in a subnet that is capable of performing home agent tasks, which are described in detail below. In a further embodiment, a wireless access point may act as its own home agent and optionally the home agent of one or more additional wireless access points.

In an embodiment, network initialization 200 also established a tunnel or other network connection between neighboring wireless access points in different subnets. This tunnel or network connection may be used for exchanging predictive roaming information, as described below; home agent information to be used for nomadic roaming; and/or any other data shared between subnets.

In an embodiment, a subnet may include one or more home agents for load balancing and reliability purposes. In an embodiment, each device in a subnet capable of acting as a home agent sends out a broadcast message to other devices in the subnet. Upon receiving broadcast messages from potential home agent devices, a wireless access point selects one or more of the potential home agent devices, possibly including itself, as its home agent.

A home agent is the contact point within a subnet for network traffic from roaming wireless clients in other subnets. As described in detail below, a home agent may be used to receive and retransmit network traffic associated with a roaming wireless client. In some circumstances, a home agent may also contact home agents in other subnets to locate the home subnet of a wireless client device.

For example, wireless access points 115a, 130a, and 130b are configured to act as home agents. Thus, wireless access point 115a will be selected as the home agent for subnet 1 105 and wireless access points 130a and 130b will be selected as the home agents for subnet 2 120. Neighbor wireless access points 115b and 130a, as well as the other wireless access points, will have the IP addresses of their respective home agents in their subnets.

To facilitate roaming, each home agent maintains a list of the addresses, such as the IP addresses, of home agents in other subnets. In an embodiment, this information is obtained by exchanging home agent addresses via the neighbor wireless access points. For example, wireless access point 115b is aware that wireless access point 130a is in a different subnet. Thus, wireless access point 115b sends home agent information 210a to the neighboring wireless access point 130a. Similarly, wireless access point 130a sends home agent information 210b to wireless access point 115b. Following the exchange of home agent information 210, wireless access points 115b and 130a have the addresses of home agents in both subnet 1 105 and subnet 2 120. Wireless access points 115b and 130a may then share this information with their respective home agents, so that home agents 115a, 130a, and 130b each have the addresses of home agents in both subnet 1 105 and subnet 2 120. In an embodiment, home agent information 210 may travel directly between neighboring wireless access points via their wireless data connection or indirectly through wired and/or wireless network connections and numerous network devices to reach neighboring wireless access points in different subnets.

Once the wireless network has been initialized by discovering neighboring wireless access points, selecting home agents, and exchanging home agent addresses, the wireless network is ready to support roaming wireless clients. One type of roaming enabled by an embodiment of the invention is predictive roaming. Predictive roaming allows wireless clients to connect with one or more subnets outside of their initial or home subnet while maintaining their IP addresses in the home subnet and without any disruption to their network connections or data traffic.

Figure 3:
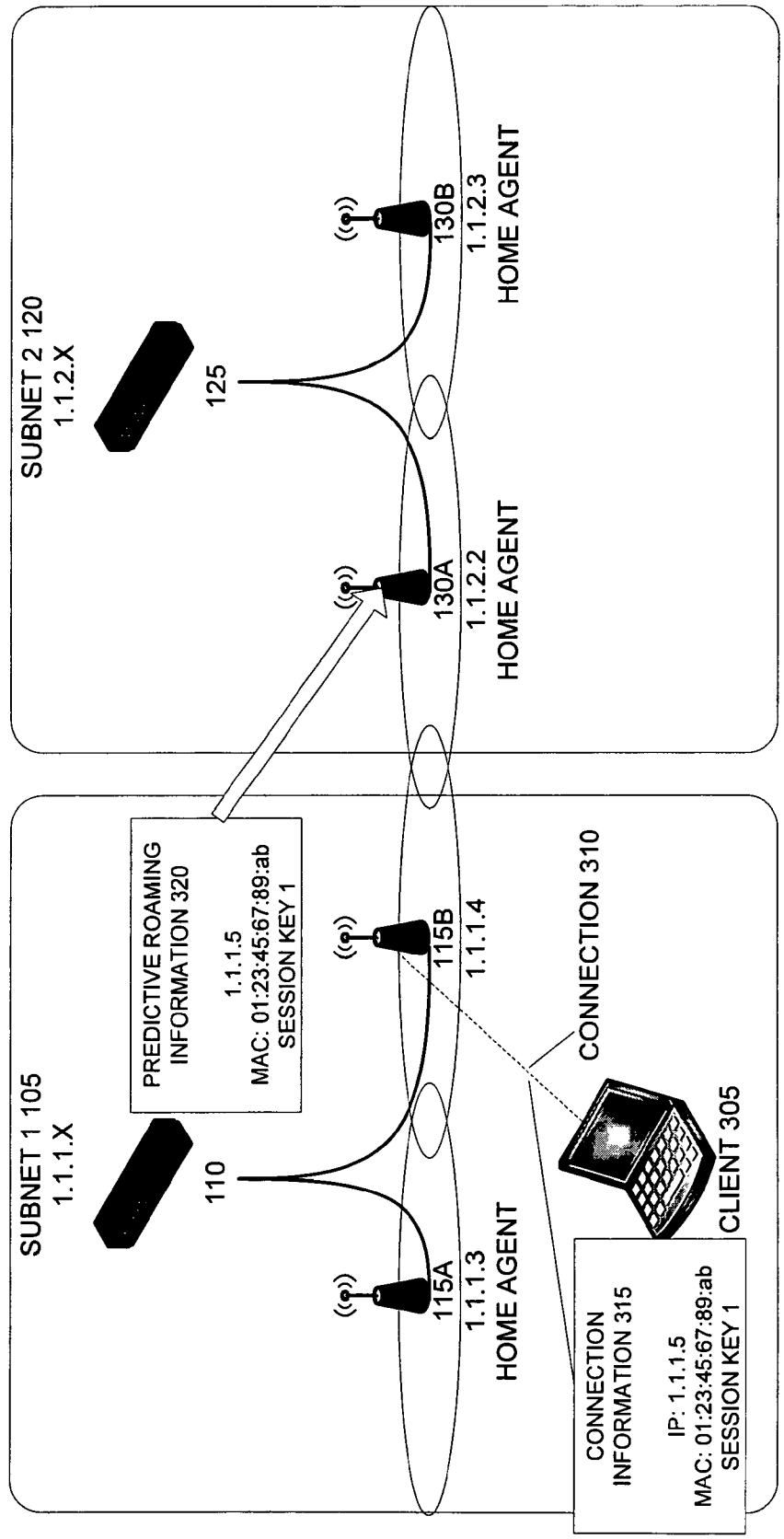
FIG. 3 illustrates a first part of an example of predictive roaming according to an embodiment of the invention.

FIG. 3 illustrates a first part 300 of an example of predictive roaming according to an embodiment of the invention. In this example, a wireless network, such as wireless network 100, is connected with a wireless client 305. Wireless clients can include mobile devices, such as laptop computers, personal digital assistants, mobile Internet devices, media player devices with wireless network interfaces, voice-over IP (VOIP) telephone devices, and navigation systems with wireless network interfaces; fixed devices, such as desktop computers with wireless network interfaces; and any other electronic device including a wireless network interface.

In this part 300 of the example of predictive roaming, the wireless client 305 is connected with wireless access point 115b. Wireless access point 115b provides wireless client 305 with a network connection 310 to the wireless network 100 as well as any other connected networks, such as the Internet. Upon the wireless client connecting with a wireless access point that is a neighbor to any wireless access point in a different subnet, an embodiment of the wireless access point provides connection information for the wireless client to one or more neighboring wireless access points in different subnets. This connection information is referred to as predictive roaming information and is used to maintain the wireless client's network connection if it roams to the physical coverage area of a different subnet.

In an embodiment, the predictive roaming information includes the IP address and MAC address associated with a wireless client; session keys used for security and/or encryption of the wireless client's network connection; and optionally other information used to establish and maintain the wireless client's network connection, such as virtual LAN (VLAN) information, including, for example, a virtual LAN identifier.

For example, wireless client 305 is connected via network connection 310 with wireless access point 115b. Network connection 310 includes connection information 315, including for example the IP address, MAC address, and session keys, used by wireless client 305 to communicate with wireless access point 115b. In an embodiment, when wireless client 305 establishes a connection with wireless access point 115b, wireless access point 115b forwards predictive roaming information 320, for example including the IP address, MAC address, and session keys used by the wireless client 305, to its neighbor wireless access point 130a in subnet 2 120. In an embodiment, predictive roaming information 320 may travel directly between neighboring wireless access points via their wireless data connection or indirectly through wired and/or wireless network connections and numerous network devices to reach neighboring wireless access points in different subnets. Wireless access point 130a stores the predictive roaming information 320 associated with wireless client 305 for later use.

Figure 4:
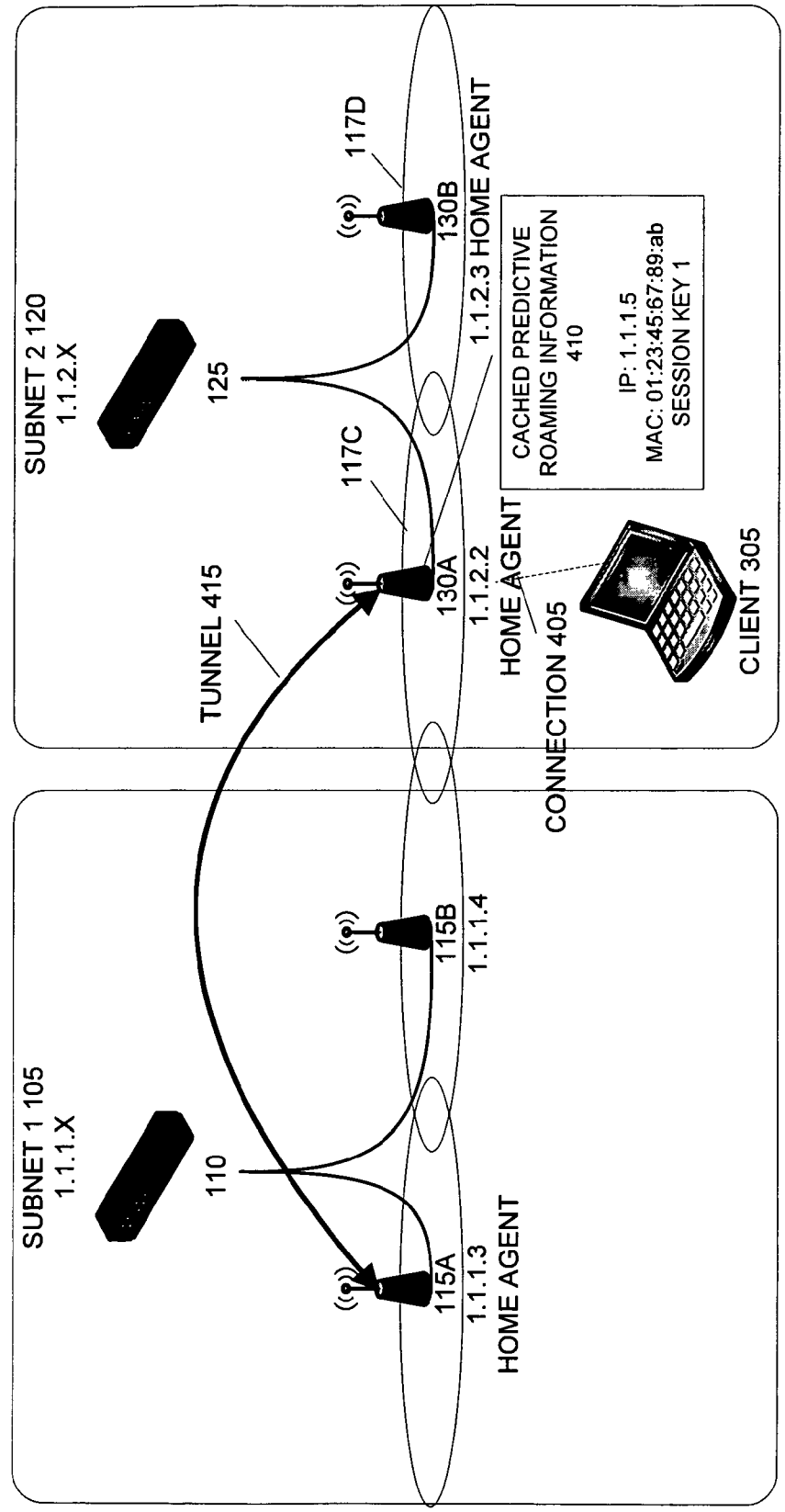
FIG. 4 illustrates a second part of an example of predictive roaming according to an embodiment of the invention.

FIG. 4 illustrates a second part 400 of an example of predictive roaming according to an embodiment of the invention. If wireless client 305 roams to the physical coverage area 117c of wireless access point 130a, wireless client 305 will attempt to establish a network connection 405 with wireless access point 130a in subnet 2 120. Upon connecting with the wireless client 305, wireless access point 130a will obtain identifying information, such as the MAC address of the wireless client 305. Wireless access point 130a will compare this identifying information with its stored predictive roaming information 410.

In this example 400, the MAC address of the wireless client 305 matches the predictive roaming information 410 previously received from wireless access point 115b. As a result, wireless access point 130a knows the home IP address of the wireless client 305. Using this home IP address of wireless client 305, wireless access point 130a determines the home subnet of the wireless client 305, in this case subnet 1 105. Wireless access point 130a contacts one of its home agent devices (e.g. itself or wireless access point 130b) to determine the IP address of a home agent in the home subnet (e.g. subnet 1 105) of the wireless client 305, such as wireless access point 115a.

Wireless access point 130a then establishes a tunnel 415, such as a GRE tunnel, between itself and the home agent 115a in subnet 1 105 for carrying network traffic associated with wireless client 305. Additionally, wireless access point 130a uses the session keys and other information included in the stored predictive roaming information 410 to communicate with the wireless client 305 via network connection 405. In a further embodiment, if other wireless clients with home IP addresses in subnet 1 105 roam to wireless access point 130a in subnet 2 120, tunnel 415 may be used to carry these wireless clients' network traffic as well.

The process of predictive roaming shown in FIGS. 3 and 4 may be repeated as the wireless client moves to the physical coverage areas of other wireless access points within subnet 2 120 or other subnets. For example, upon the wireless client 305 connecting with wireless access point 130a, as shown in FIG. 4, wireless access point 130a will provide a copy of the predictive roaming information 410 for wireless client 305 to any neighboring wireless access points in the same or a different subnet, such as wireless access point 130b. If the wireless client 305 later moves into the physical coverage area 117d of wireless access point 130b, wireless access point 130b will use its copy of the predictive roaming information 410 to establish a tunnel between itself and the home agent 115a to handle the data traffic of wireless client 305.

Figure 5:
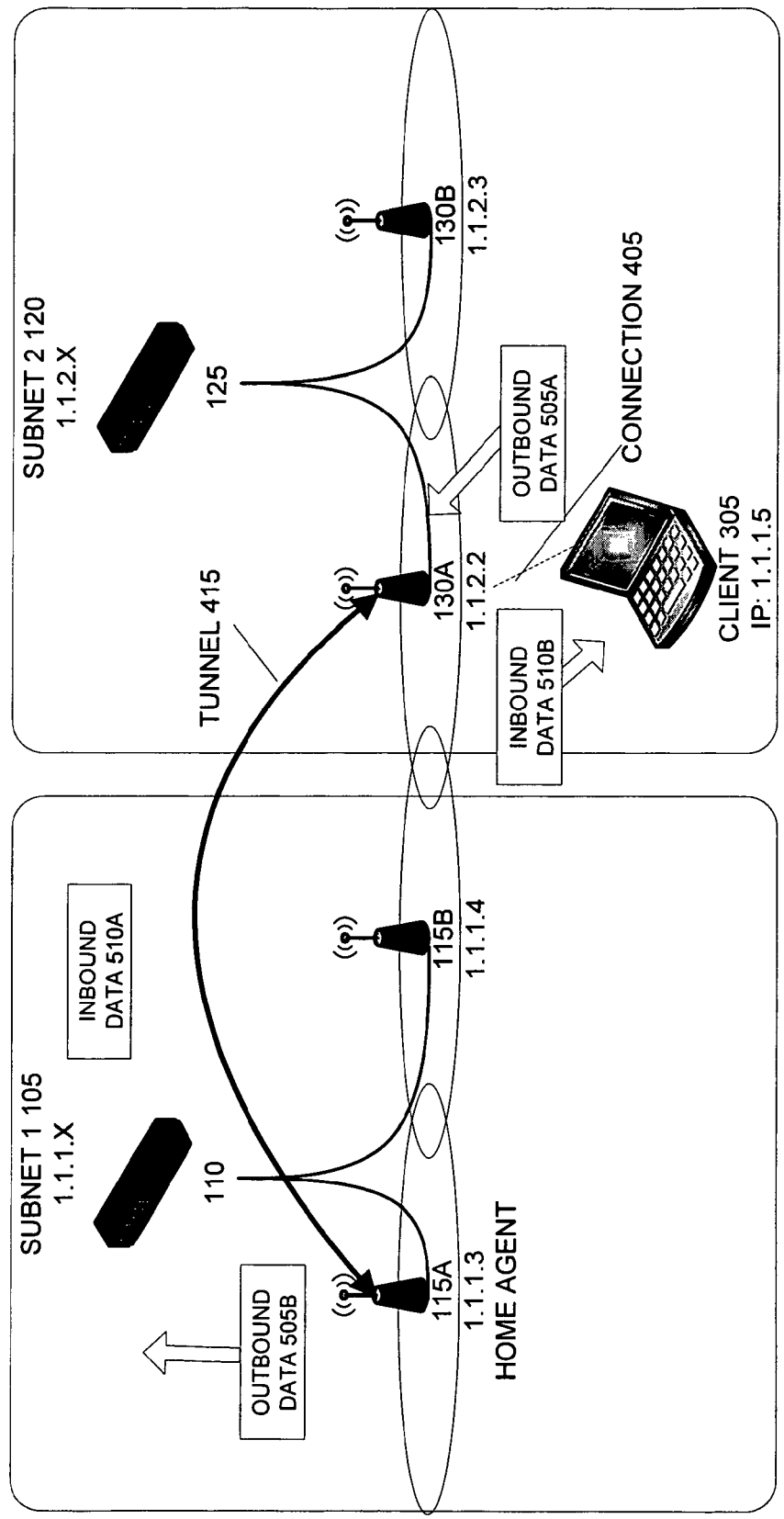
FIG. 5 illustrates example data traffic during predictive roaming according to an embodiment of the invention.

FIG. 5 illustrates an example 500 of data traffic during predictive roaming according to an embodiment of the invention. In the example 500 of FIG. 5, data 505 from a wireless client 305 is communicated via network connection 405 to wireless access point 130a. Wireless access point 130a directs data 505a through tunnel 415 to wireless access point 115a, which acts a home agent for subnet 1 105, the home subnet of wireless client 305. Wireless client 115a then rebroadcasts data 505b to its intended destination.

In an embodiment, when the tunnel 415 is established or when a new wireless client uses the tunnel 415, the home agent wireless access point 115a, switch 110, and any other devices in subnet 1 105 modify their routing tables to redirect network traffic addressed to the wireless client to the home agent wireless access point 115a. This may be done, for example, by associating the home agent 115a with the MAC address of the wireless client 305 and using layer 2 routing to direct data traffic within the subnet. In this example, when a wireless client is newly associated with a tunnel to a home agent in its home subnet, the home agent broadcasts a routing update message to other devices within the subnet to associate the wireless client's MAC address or other identifying information with the home agent.

The updated routing information is used to intercept and redirect network traffic addressed to roaming wireless clients. During predictive roaming, the wireless client 305 believes it still has its original IP address in its home subnet 1 105. Thus, example data 510a directed to the wireless client 305 will be addressed to the IP address of wireless client 305. In an embodiment, switch 110 in subnet 1 105 receives data 510a addressed to the home IP address of wireless client 305 and uses layer 2 routing to redirect this data 510b to the home agent wireless access point 115a, in accordance with its updated routing tables. In this example, redirected data 510b is addressed to the MAC address of the wireless client 305.

Upon receiving redirected data 510b, home agent wireless access point 115a forwards this data 510b through tunnel 415 to wireless access point 130a. Wireless access point 130a uses layer 2 routing, such as MAC addresses, to direct data 510b to wireless client 305.

Similarly, in a further embodiment, any broadcast data traffic within subnet 1 105 is also received by home agent wireless access point 115a and forwarded via tunnel 415 to the wireless client 305.

In the above examples of predictive roaming, neighboring wireless access points receive roaming information about nearby wireless clients before potentially connecting with the wireless clients. However, in some cases, a wireless access point may receive a connection request from a wireless client without previously receiving any associated roaming information. For example, a wireless device may originally connect with a wireless network in a first subnet, and then enter a low-power, inactive, or suspended operation mode. A user may then move the wireless device in its inactive state to the physical coverage area of a different, non-adjacent wireless access point in a different subnet.

An embodiment of the invention includes a nomadic roaming mode allowing wireless clients to keep their IP address when moving to a different subnet, even if wireless access points do not have predictive roaming information for these wireless clients. FIG. 6 illustrates an example 600 of nomadic roaming according to an embodiment of the invention. In example 600, the wireless network 100 described above has been expanded to include subnet 3 605. Subnet 3 605 includes a switch 607 and wireless access points 610a and 610b. In this example 600, the physical coverage areas 612 of wireless access points 610a and 610b do not overlap with the physical coverage areas of any of the wireless access points in subnets 1 105 or 2 120. In subnet 3 605, wireless access point 610b acts as a home agent.

For example 600, it is assumed that wireless client 305 was previously connected with wireless access point 115b, as shown in FIG. 3. For example 600, wireless client 305 is moved to the physical coverage area 612a associated with wireless access point 610a. Wireless client 305 forms a network connection with wireless access point 610a. However, wireless access point 610a does not include any predictive roaming information associated with wireless client 305, for example because wireless client 305 was in an inactive state during its movement to subnet 3 605 or because of a gap in the physical coverage of the wireless network 100 between subnets 1 105 and 3 605.

In an embodiment, wireless access point 610a compares the MAC address or other identifying information of wireless client 305 with its stored predictive roaming information, if any. If the wireless access point 610a does not have any predictive roaming information for the wireless client 305, wireless access point 610a attempts to locate the home subnet of the wireless client 305. In an embodiment, wireless access point 610a provides its home agent, in this example wireless access point 610b with the MAC address of the wireless client 305.

As described above, home agents know the address of home agents in other subnets. Home agent 610b sends a broadcast query message including wireless client's 305 MAC address to at least one of the home agents in each of the subnets 1 105 and 2 120. Each home agent receiving this broadcast query message will determine if this MAC address was last associated with itself, either directly or through another wireless access point in the same subnet. If a home agent does not have a cache of associated wireless clients, it will rebroadcast this query message to any other wireless access points in the subnet, asking these wireless access points if they were previously connected with a wireless client having this MAC address.

In response to this query message, at least one wireless access point will respond indicating that it was previously connected with the wireless client 305. In example 600, wireless access point 115b responds to this query message. This response is forwarded back to wireless access point's 115b home agent, wireless access point 115a, which in turn forwards the response to home agent 610b and back to wireless access point 610a. Wireless access point 610a will use this information to establish a tunnel 620 between itself and a home agent in subnet 1 105, the wireless client's 305 home subnet. The establishment and operation of the tunnel 620 is similar to that of tunnel 415 used for predictive roaming discussed above. However, because wireless access point 610a does not have session keys or other security information associated with wireless client 305, wireless access point 610a will have to establish a new session and exchange new security information with wireless client 305. Despite this, wireless client 305 can continue to operate as if it had its original IP address in subnet 1 105.

For both predictive and nomadic roaming, a tunnel is used to carry network traffic addressed to the wireless client's original IP address in a home subnet to the wireless client when it is in a different subnet. This allows the wireless client to roam to different network subnets without disrupting network data traffic. However, maintaining tunnels for large numbers of wireless clients may be inefficient. In a further embodiment, if a network connection of a wireless client is idle or inactive for a sufficiently long period of time, the wireless client is sent a message breaking down its old network connection and assigning the wireless client a new IP address in its current network subnet. Because the wireless client's network connection is inactive, this operation does not cause any noticeable disruption in network service. At this point, the tunnel may be discarded if not needed by other wireless clients.

Figure 7:
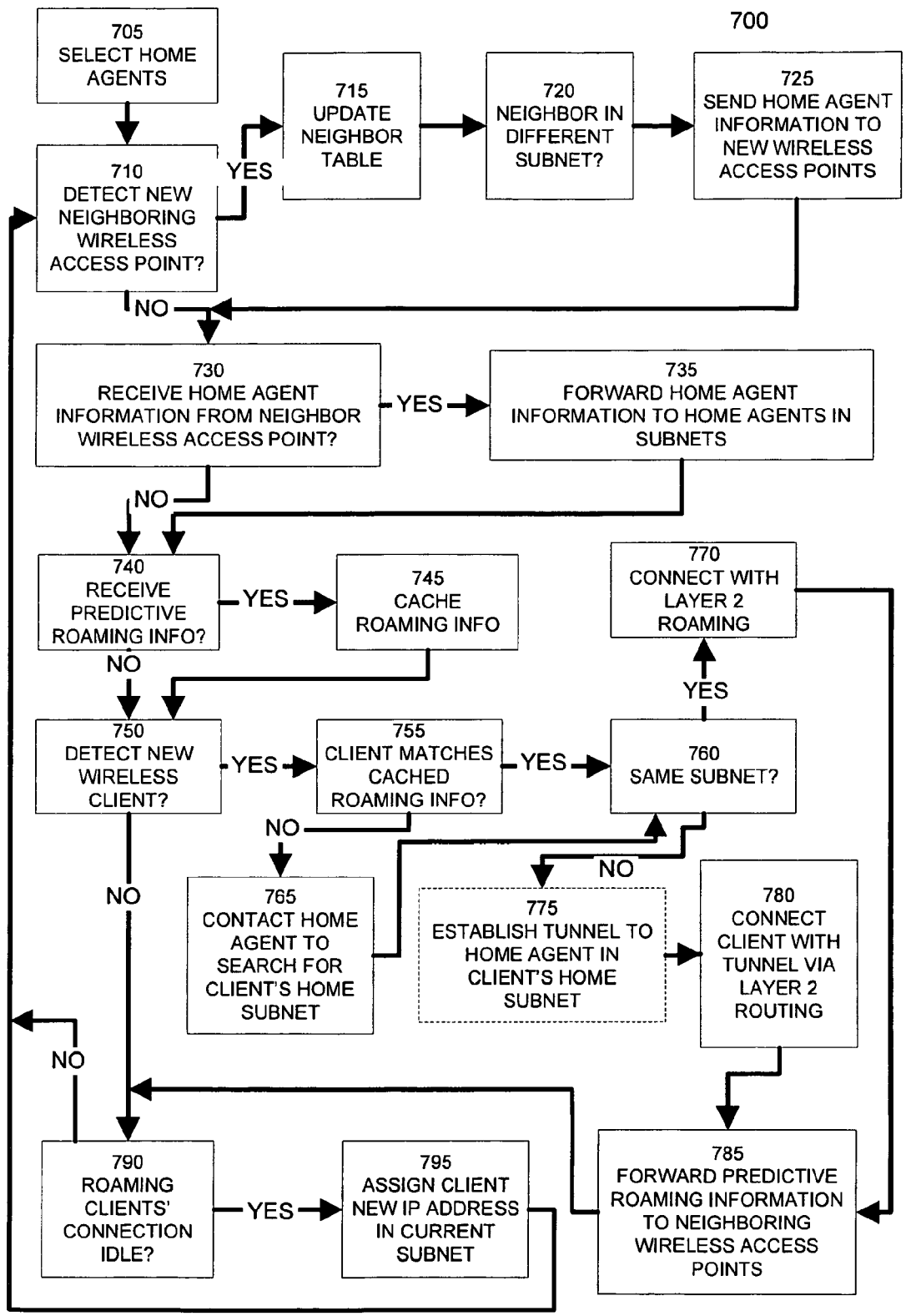
FIG. 7 illustrates an example method implementing predictive and nomadic roaming in a wireless access point or other network device according to an embodiment of the invention.

FIG. 7 illustrates an example method 700 implementing predictive and nomadic roaming in a wireless access point or other network device according to an embodiment of the invention. Step 705 selects one or more home agents within the same subnet as the wireless access point. As discussed above, a wireless access point may act as its own home agent. Multiple home agents may be used in a subnet for load balancing and reliability purposes.

Step 710 determines if any new neighboring wireless access points are detected by the wireless access point. As discussed above, an embodiment of the invention detects neighboring wireless access points using their beacon radio signals. If any new neighbor wireless access points are detected, step 715 updates the neighbor table of the wireless access point to include the new neighboring wireless access point or points. Otherwise, method 700 proceeds to step 730. Following step 715, step 720 determines if the neighboring wireless access point is in a different subnet than the wireless access point. If so, step 725 sends its home agent information to the new neighboring wireless access points. Following either steps 720 or 725, method 700 proceeds to step 730.

Step 730 determines if the wireless access point has received home agent information from any neighboring wireless access points in different network subnets. If so, step 735 forwards this home agent information to its home agent or agents, so that the home agents in the wireless access point's subnet are aware of all of the home agents in other subnets. Following either step 730 or 735, method 700 proceeds to step 740.

Step 740 determines if the wireless access point has received any predictive roaming information from other wireless access points. In an embodiment, the wireless access point may receive predictive roaming information from other wireless access points in the same subnet or a different subnet. Step 745 caches any received predictive roaming information. Following either step 740 or 745, method 700 proceeds to step 750.

Step 750 determines if a new wireless client is connecting with the wireless access point. If so, step 755 determines if the wireless client matches any of the cached predictive roaming information previously received and cached by the wireless access point. If so, step 760 determines if the wireless client has been assigned an IP address in the same network subnet as the wireless access point. If so, step 770 connects with the wireless client using standard layer 2 intra-subnet roaming techniques.

Returning to step 760, if the wireless client matches the wireless access point's cached predictive roaming information and the wireless client has an assigned IP address in a different subnet than the wireless access point, then predictive roaming as described is used to maintain the network connection with the wireless client. Step 775 establishes a tunnel, such as a GRE tunnel, between the wireless access point and a home agent in the wireless client's home subnet, if a tunnel does not already exist. If a tunnel between the wireless access point and a home agent in the wireless client's subnet already exists, an embodiment of method 700 skips step 775 and the wireless access point uses the previously created tunnel.

In an embodiment, the wireless access point in step 775 contacts its home agent to determine an IP address for one or more home agents in the home subnet of the new wireless client. In a further embodiment, the wireless access point or home agent selects one or more home agents in the wireless client's home subnet using load balancing selection techniques, such as a simple round-robin selection technique. More complicated load balancing techniques may select the home agent for tunneling using load information such as network traffic; the number of tunnels associated with a home agent; CPU, memory, network bandwidth, or other computing resource usage; and network quality of service metrics.

Following step 775, step 780 connects the wireless client with the tunnel using layer 2 routing techniques, as described above with reference to FIG. 5, so that outbound data traffic from the wireless client is directed from the wireless access point via the tunnel to the wireless client's home subnet and then to its intended destination. Similarly, inbound data traffic to the wireless client is intercepted by the home agent associated with the tunnel in the wireless client's home subnet and transferred via the tunnel to the wireless access point. The wireless access point then directs the data traffic to the wireless client using layer 2 routing.

Returning to step 755, if the wireless client connecting with the wireless access point does not match the wireless access point's cached predictive roaming information, then an embodiment of method 700 uses the nomadic roaming techniques described above to connect with the wireless client. Accordingly, the wireless access point in step 765 contacts its home agent and requests that it locates the home subnet of the wireless client. The home agent sends a query message including the MAC address and/or other identifying information of the wireless to home agents in other subnets to locate the home subnet of the wireless client, as described above.

Upon receiving a reply message identifying the home subnet of the wireless client, an embodiment of the wireless access point proceeds from step 765 to step 760. Method 700 then proceeds as described above.

Following either step 770 or 780, an embodiment of method 700 proceeds to step 785 and forwards predictive roaming information about the wireless client to neighboring wireless access points on its neighbor list. This information may be used by neighboring wireless access points if the wireless client later roams to any of the neighboring wireless access points in the same subnet or a different subnet.

Following step 785, method 700 proceeds to step 790. Step 790 determines if any of the roaming wireless clients currently connected with the wireless access point have idle network connections. If so, step 795 assigns a new IP address within the current subnet to the wireless client. If there are no more roaming wireless clients using a tunnel associated with the wireless access point, then an embodiment of step 795 may remove the tunnel to conserve network resources.

Following either step 790 or 795, method 700 may return to step 710 to repeat a portion of method 700 for additional iterations.

Figure 8:
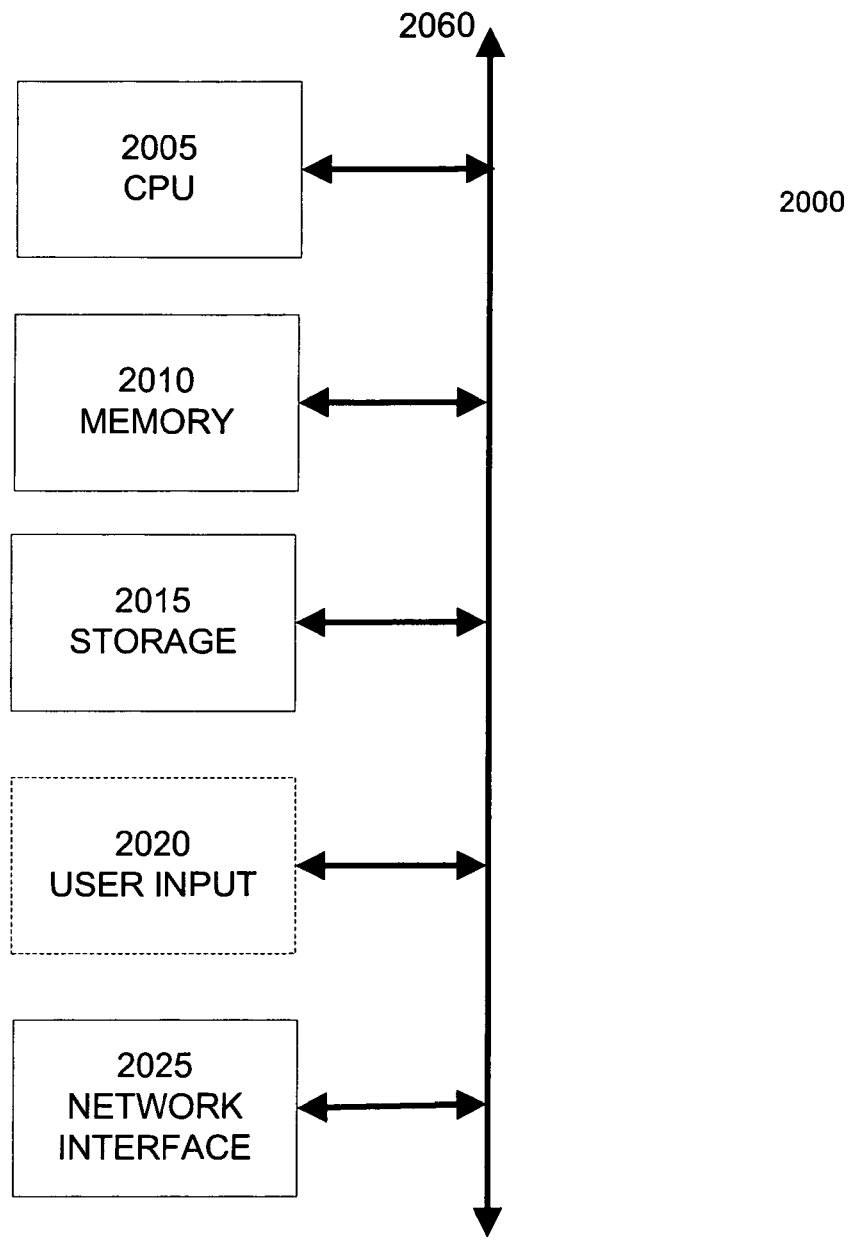
FIG. 8 illustrates an example computer system suitable for implementing an embodiment of the invention.

FIG. 8 illustrates a computer system suitable for implementing an embodiment of the invention. FIG. 8 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
   receiving home agent information at a first wireless network access point in a first network subnet from a second wireless network access point in a second network subnet different from the first network subnet;
   forwarding the home agent information to a first home agent in the first network subnet;
   receiving predictive roaming information for a wireless client indicating that a home network subnet for the wireless client is the second network subnet;
   detecting that the wireless client is wirelessly connected at the first wireless network access point;
   determining, using the predictive roaming information, that the home network subnet of the wireless client is the second network subnet;
   determining, using the home agent information, an identification of a second home agent that is a home agent of the second network subnet;
   establishing a network tunnel between the first wireless network access point and the second home agent for managing wireless network access of the wireless client through the first wireless network access point.

2. The method of claim 1, wherein the network tunnel is a generic routing encapsulation tunnel.

3. The method of claim 1, wherein in managing the wireless network access, the second home agent intercepts inbound network traffic for the wireless client and forwards the network traffic to the first wireless network access point using the network tunnel.

4. The method of claim 1, wherein in managing the wireless network access, the first wireless network access point intercepts outbound network traffic from the wireless client and forwards the outbound network traffic to the second home agent using the network tunnel.

5. The method of claim 1, wherein the network tunnel is established with the second home agent through the second wireless network access point.

6. The method of claim 1, further comprising:
   detecting that a second wireless client is wirelessly connected at the first wireless network access point;
   checking the predictive roaming information to see if the second wireless client is in the predictive roaming information;
   if it is determined that the second wireless client is absent from the predictive roaming information, querying the first home agent to determine an identification of a home agent of the second wireless client;
   establishing a tunnel with the home agent of the second wireless client using the identification of the home agent of the second wireless client for managing wireless network access of the second wireless client through the first wireless network access point.

7. The method of claim 1, further comprising:
   determining if the wireless connection of the wireless client has become idle;
   if it is determined that the wireless connection of the wireless client has become idle, assigning a new Internet Protocol (IP) address in the first network subnet to the wireless client.

8. The method of claim 1, further comprising:
   determining if the wireless connection of the wireless client has become idle;
   if it is determined that the wireless connection of the wireless client has become idle, tearing down the network tunnel between the first wireless network access point and the second home agent.

9. The method of claim 1, wherein the predictive roaming information includes an identifier associated with the wireless client and independent of an Internet Protocol (IP) address of the wireless client, the identifier further used to determine that the home network subnet of the wireless client is the second network subnet.

10. A system comprising:
    a first home agent in a first network subset for managing access points in the first network subset;
    a first wireless network access point in the first network subnet and configured to:
      receive home agent information from a second wireless network access point in a second network subnet different from the first network subnet;
      forward the home agent information to the first home agent in the first network subnet;
      receive predictive roaming information for a wireless client indicating that a home network subnet for the wireless client is the second network subnet;
      detect that the wireless client is wirelessly connected at the first wireless network access point;
      determine, using the predictive roaming information, that the home network subnet of the wireless client is the second network subnet;
      determine, using the home agent information, an identification of a second home agent that is a home agent of the second network subnet;
      establish a network tunnel between the first wireless network access point and the second home agent for managing wireless network access of the wireless client through the first wireless network access point.

11. The system of claim 10, wherein the network tunnel is a generic routing encapsulation tunnel.

12. The system of claim 10, wherein in managing the wireless network access, the second home agent intercepts inbound network traffic for the wireless client and forwards the network traffic to the first wireless network access point using the network tunnel.

13. The system of claim 10, wherein in managing the wireless network access, the first wireless network access point intercepts outbound network traffic from the wireless client and forwards the outbound network traffic to the second home agent using the network tunnel.

14. The system of claim 10, wherein the network tunnel is established with the second home agent through the second wireless network access point.

15. The system of claim 10, wherein the first wireless network access point is further configured to:
- detect that a second wireless client is wirelessly connected at the first wireless network access point;
- check the predictive roaming information to see if the second wireless client is in the predictive roaming information;
- query the first home agent to determine an identification of a home agent of the second wireless client, if it is determined that the second wireless client is absent from the predictive roaming information;
- establish a tunnel with the home agent of the second wireless client using the identification of the home agent of the second wireless client for managing wireless network access of the second wireless client through the first wireless network access point.

16. The system of claim 10, wherein the first wireless network access point is further configured to:
- determine if the wireless connection of the wireless client has become idle;
- assign a new Internet Protocol (IP) address in the first network subnet to the wireless client if it is determined that the wireless connection of the wireless client has become idle.

17. The system of claim 10, wherein the first wireless network access point is further configured to:
- determine if the wireless connection of the wireless client has become idle;
- tear down the network tunnel between the first wireless network access point and the second home agent, if it is determined that the wireless connection of the wireless client has become idle.

18. The system of claim 10, wherein the predictive roaming information includes an identifier associated with the wireless client and independent of an Internet Protocol (IP) address of the wireless client, the identifier further used to determine that the home network subnet of the wireless client is the second network subnet.

* * * * *